(12) United States Patent
Onishi

(10) Patent No.: US 9,686,442 B2
(45) Date of Patent: Jun. 20, 2017

(54) INFORMATION PROCESSING APPARATUS AND METHOD FOR CONTROLLING THE SAME

(71) Applicant: CANON KABUSHIKI KAISHA, Tokyo (JP)

(72) Inventor: Tetsuya Onishi, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/857,625

(22) Filed: Sep. 17, 2015

(65) Prior Publication Data

US 2016/0094756 A1 Mar. 31, 2016

(30) Foreign Application Priority Data

Sep. 25, 2014 (JP) ................. 2014-194653

(51) Int. Cl.
*G06F 3/12* (2006.01)
*H04N 1/44* (2006.01)
*H04N 1/00* (2006.01)
*H04N 1/32* (2006.01)

(52) U.S. Cl.
CPC .......... *H04N 1/442* (2013.01); *H04N 1/0097* (2013.01); *H04N 1/00251* (2013.01); *H04N 1/32101* (2013.01); *H04N 1/4433* (2013.01); *H04N 2201/0094* (2013.01)

(58) Field of Classification Search
USPC ............................................. 358/1.13, 1.15
See application file for complete search history.

(56) References Cited

U.S. PATENT DOCUMENTS

| 2003/0215114 A1* | 11/2003 | Kyle | G06F 21/32 382/115 |
| 2007/0250920 A1* | 10/2007 | Lindsay | G06F 21/31 726/7 |
| 2013/0268764 A1* | 10/2013 | Valdes | G06F 21/552 713/178 |
| 2013/0269013 A1* | 10/2013 | Parry | H04L 63/0861 726/7 |
| 2015/0077555 A1* | 3/2015 | Scalisi | H05B 37/0272 348/143 |

FOREIGN PATENT DOCUMENTS

JP 2010-277557 A 12/2010

* cited by examiner

*Primary Examiner* — Jerome Grant, II
(74) *Attorney, Agent, or Firm* — Canon USA Inc., IP Division

(57) ABSTRACT

A multifunction printer captures an image, extracts face data of each person from the captured image, verifies whether each person has been authenticated based on the extracted face data, transmits face data of a person that cannot be verified to have been authenticated to an external apparatus, requests authentication of that person, temporarily stores face data of each authenticated person, collates extracted face data of each person with stored face data, and verifies whether each person has been authenticated.

17 Claims, 15 Drawing Sheets

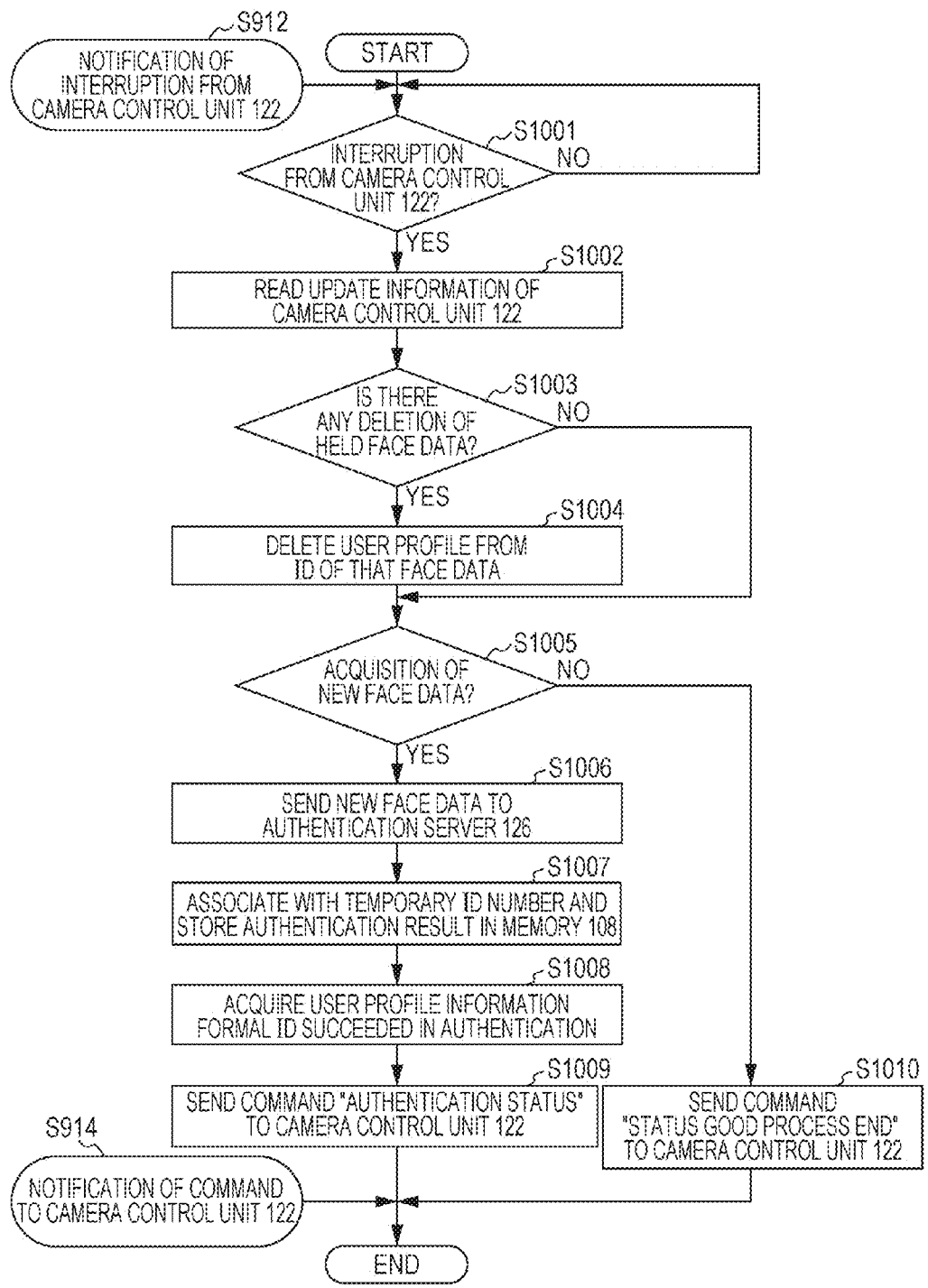

FIG. 11

| USER ID | USER PROFILE | | |
| --- | --- | --- | --- |
| | MANIPULATION UNIT LAYOUT | CLOUD SERVER PATH | ADDRESS BOOK |
| A | LAYOUT A | \ROOT\CLOUD\NAME_A | ADDRESS_A |
| B | LAYOUT B | \ROOT\CLOUD\NAME_B | ADDRESS_B |
| C | ORDINARY LAYOUT | ——— | ADDRESS_C |

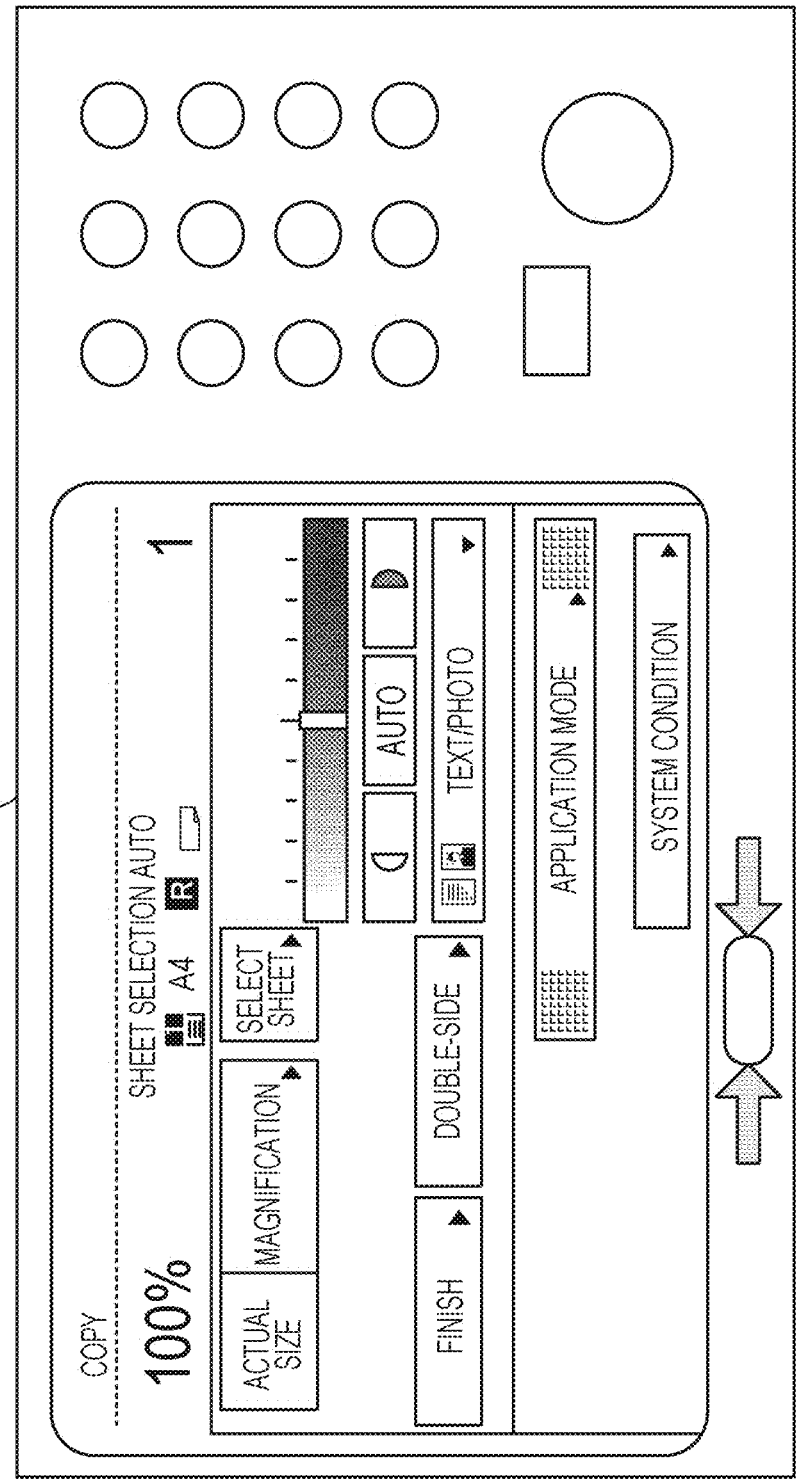

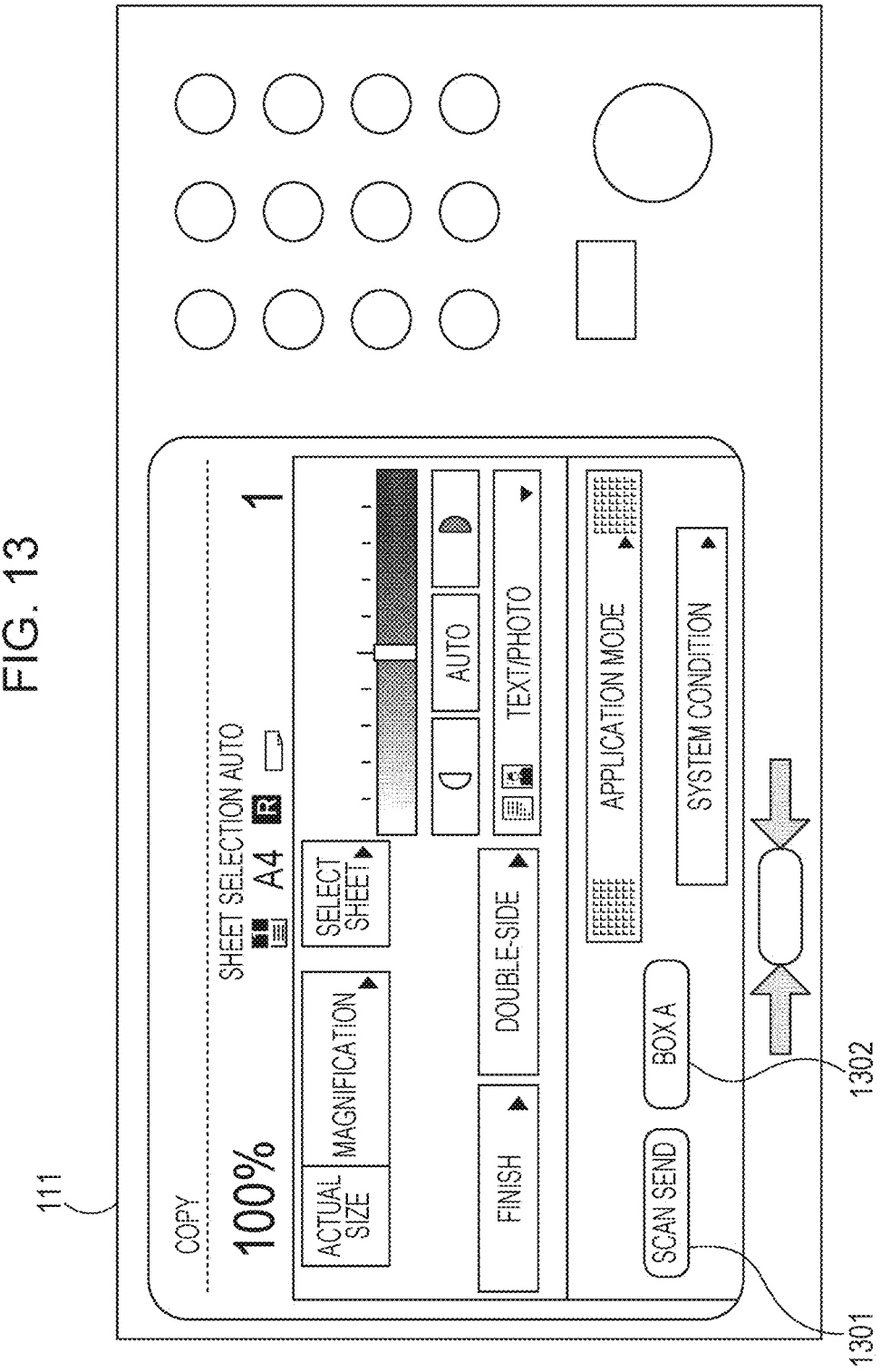

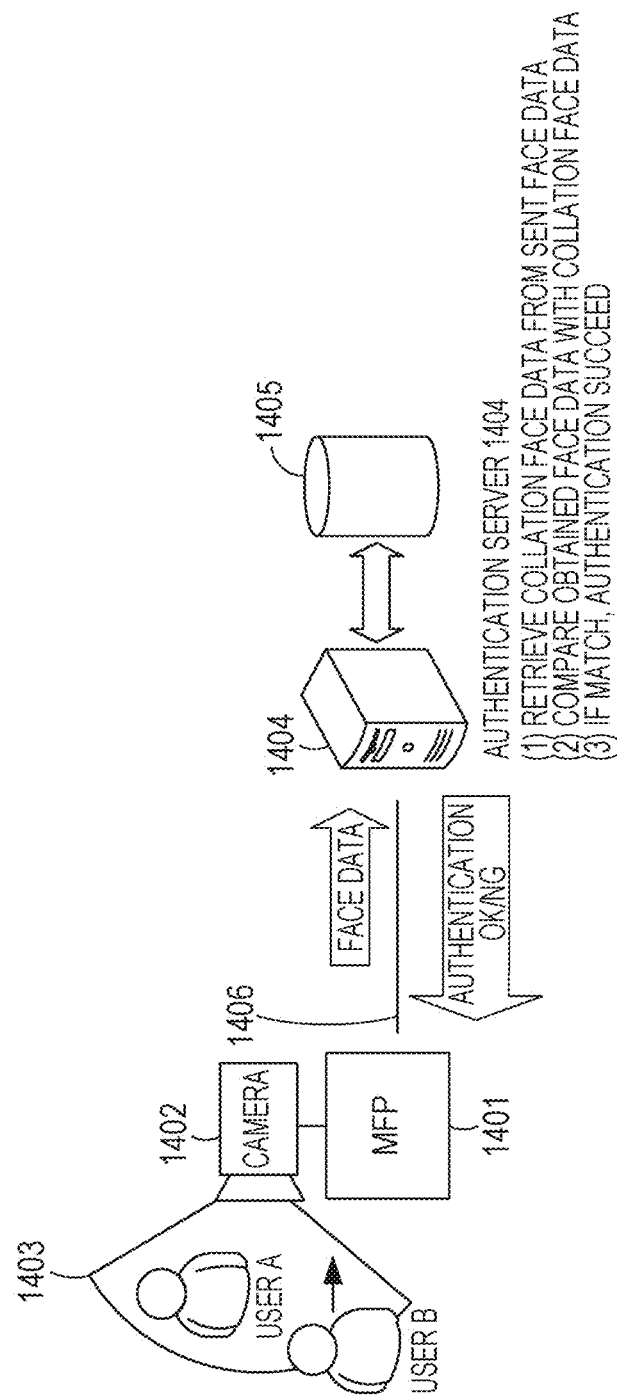

INFORMATION PROCESSING APPARATUS AND METHOD FOR CONTROLLING THE SAME

BACKGROUND

Field

Aspects of the present invention generally relate to authentication control of an information processing apparatus.

Description of the Related Art

In information processing apparatuses, such as a multi-functional peripheral and a multifunctional printer (MFP), user authentication is performed.

User authentication in these systems is performed as follows.

Authentication information for identity verification of the user is registered in an authentication server. Authentication information is acquired from authentication information input by the user or an IC card that the user carries, and the system communicates with the authentication server for identity verification. If identity verification is successfully completed, use of the MFP is permitted, and if not, use of the MFP is not permitted. In this manner, use of the MFP by an unregistered person can be controlled. Some devices acquire profile information of a person, customize a manipulation panel based on the information, or download and use personal address information.

Japanese Patent Laid-Open No. 2010-277557 discloses a technique to perform an authentication process quickly when a user logs in to a multi-functional peripheral by acquiring authentication information of the user regarding the multi-functional peripheral that the user may use from a server when the user enters a room, and holding the acquired information in the multi-functional peripheral.

In some authentication methods, face data is used as the authentication information.

The MFP is equipped with a camera with which the face of a person manipulating the MFP is recognized. Feature points of the face are sent to an authentication server for identity verification.

FIG. 14 schematically illustrates related art face recognition using a camera.

As illustrated in FIG. 14, a MFP 1401 includes a camera 1402 and is connected to be communicable with an authentication server 1404 via a network 1406. An authentication database 1405 in which face data used for face recognition of the user is stored is connected to the authentication server 1404.

The reference numeral 1403 denotes a camera recognition area of the camera 1402. When a user A is recognized with the camera 1402, the MFP 1401 acquires feature data of the face of the user A (i.e., extracts feature information from the face of the user A) and sends the feature data as face data to the authentication server 1404 via the network 1406 to make an authentication request.

The authentication server 1404 (1) retrieves the authentication database 1405 based on the sent face data, (2) compares the sent face data with collation face data and, (3) if the sent face data matches the collation face data, notifies permission of authentication to the MFP 1401.

If a user B is recognized with the camera 1402, the MFP 1401 makes an authentication request to the authentication server 1404 as in the case of the user A to perform authentication.

As described above, a plurality of users may be authenticated by a single MFP 1401. The MFP 1401 may, for example, authenticate all the users in the recognition area 1403 of the camera.

The MFP 1401 detects a person approaching itself with the camera, and performs face recognition in advance so that the person's profile information is prepared in advance. Therefore, when the user manipulates the manipulation panel, the MFP 1401 is ready to use. Thus, in the MFP 1401, convenience is increased by utilizing the characteristics of automatic authentication with a camera.

The users in the recognition area 1403 of the camera change all the time: i.e., users move or enter or exit. In order for the MFP 1401 to recognize such change of the users, it is necessary to always identify each user with the camera.

In the system as disclosed in Japanese Patent Laid-Open No. 2010-277557, entrance of the user into a room is managed by notification from an entrance and exit management server, whereas in the technique of face recognition using the camera, it is necessary to recognize change of the users in the recognition area 1403 of the camera based on the face data extracted from the camera image.

In the related art technique of face recognition using a camera, however, storing confidential personal information, such as face data for identifying users, in the MFP 1401 has a potential security risk. Therefore, to always identify the users, it is necessary to acquire face data of each user located in the recognition area 1403, send the acquired face data to the authentication server 1404 in which the face data for the collation is registered, and collate the face data all the time.

For example, in the above example, if the user B enters the recognition area 1403 of the camera after the user A is authenticated, the MFP 1401 needs to send the face data of the user A to the authentication server 1404 together with face data of the user B, in order to recognize a change in the user in the recognition area 1403. The authentication server 1404 returns some statuses: e.g., for the user A, "authenticated" and for user B, "new authentication." With this status information, the MFP 1401 may recognize that the user A is still staying in the recognition area 1403, and that the user B is newcomer to the recognition area.

This collation method, however, in which face data is collated in the authentication server 1404 all the time via the network 1406 from the MFP 1401 about each user located in the recognition area 1403 takes long time. Especially collation of face data in the authentication server takes longer time than collation using an ID and the like and, therefore, there is a problem that collating face data in the authentication server about each user located in the recognition area 1403 is not operationally practical. Further, authenticating by face data in the authentication server about all the users entering in the recognition area 1403 may increase the network traffic. These issues are not limited to image processing apparatuses, such as the MFP, but also exist in any apparatuses that perform face recognition.

SUMMARY

Aspects of the present invention provide, in an information processing apparatus that authenticates a user by transmitting feature information of the user extracted using a camera to an authentication server, a mechanism to verify an authenticated user quickly and improve practicability.

According to an aspect of the present invention, an information processing apparatus that permits a user to use thereof through authentication includes an image capturing unit, an extracting unit configured to extract feature information of each person recognized based on images captured by the image capturing unit, a verification unit configured to verify whether each person has been authenticated based on feature information of each person extracted by the extracting unit, an authentication unit configured to transmit feature information of a person who cannot be verified as authenticated to an external apparatus and request authentication of the person, and a storing unit configured to temporarily store the transmitted feature information of each person authenticated by the external apparatus, wherein the verification unit collates the feature information of each person extracted by the extracting unit with the feature information stored in the storing unit, and verifies whether the person has been authenticated.

According to aspects of the present invention, in an information processing apparatus that authenticates a user by transmitting feature information of the user extracted using an image capturing unit, such as a camera, to an authentication service, an authenticated user may be verified quickly, and practicability may be improved.

Further features of the present disclosure will become apparent from the following description of exemplary embodiments with reference to the attached drawings.

BRIEF DESCRIPTION OF THE DRAWINGS

FIG. 9 is a flowchart illustrating a process of a control unit.

FIG. 11 illustrates user profile information.

FIG. 12 illustrates an ordinary manipulation unit layout.

FIG. 13 illustrates a manipulation unit layout corresponding to a layout A.

FIG. 14 schematically illustrates related art face recognition using a camera.

DESCRIPTION OF THE EMBODIMENTS

Hereinafter, embodiments are described with reference to the drawings.

First Embodiment

Figure 1:
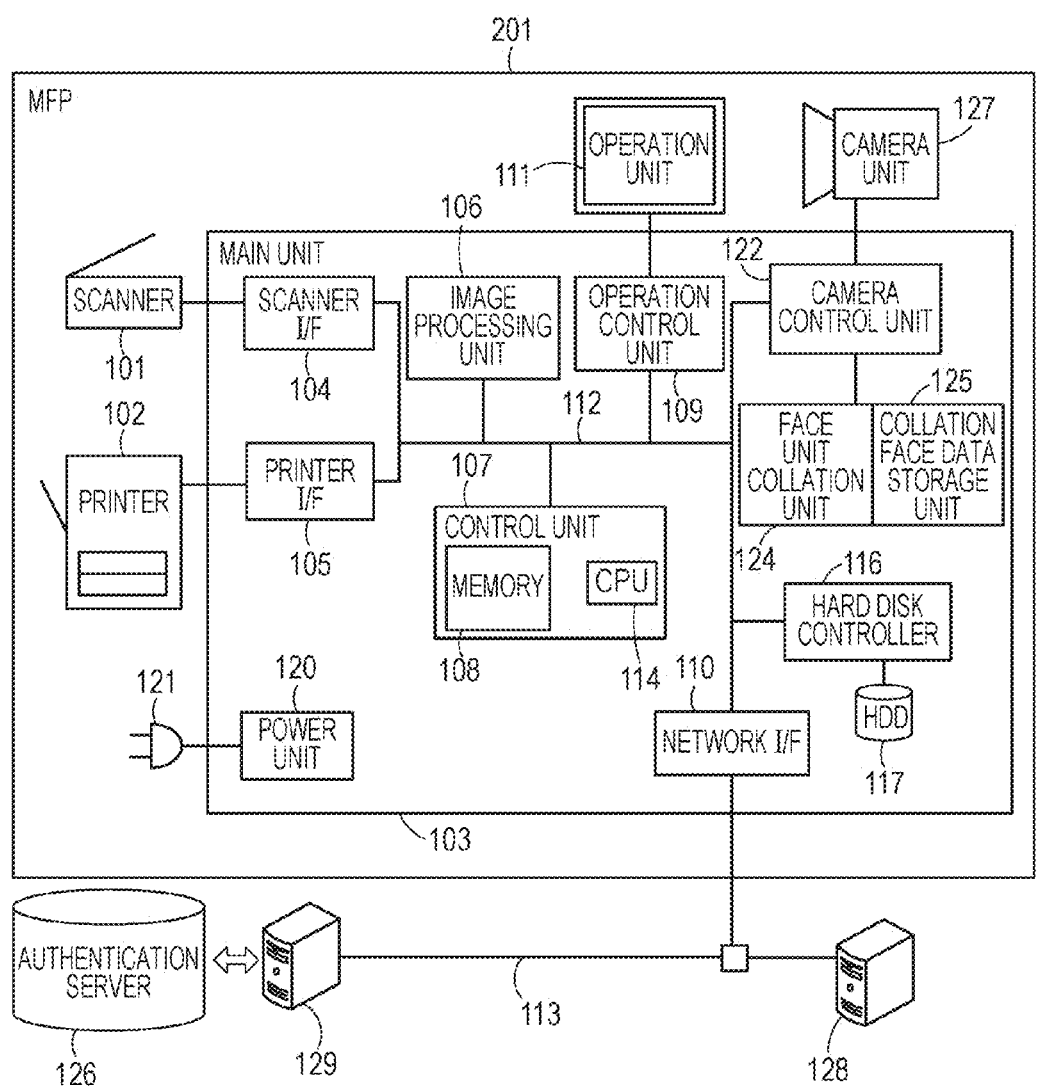
FIG. 1 is a block diagram illustrating a configuration of an information processing apparatus according to an embodiment.

FIG. 1 is a block diagram illustrating a configuration of an information processing apparatus according to an embodiment.

Examples of the present embodiment may include a multi-functional peripheral/multi-functional printer (MFP). Aspects of the present invention are also applicable to various information processing apparatuses employing user authentication, such as a personal computer, a tablet terminal, a smartphone, and an entrance management system. Aspects of the present invention are used to, for example, perform authentication quickly with an information processing apparatus that performs face recognition with a camera.

In FIG. 1, the reference numeral 201 denotes an MFP as an information processing apparatus. The MFP 201 is an exemplary information processing apparatus of which use is permitted to a user authenticated using an image captured with a camera. The MFP 201 includes, mainly, a main unit 103, and a scanner 101, a printer 102, a manipulation unit 111, and a camera unit 127.

The scanner 101 reads information on a document placed on a document table. Although not illustrated, an automatic document feeder (ADF) may be provided on the scanner 101. The ADF may be used to efficiently read a plurality of documents.

The printer 102 has a print function and prints an image read with the scanner 101, an image transferred from an IP network 113, an image read from a connected storage device (a HDD 117), and the like.

The manipulation unit 111 functions as a user interface (UI) including an input unit, such as a keyboard, a pointing device, and a touchscreen, with which an operator inputs instruction data and other data, and a display unit, such as a display on which an operation screen, document information, and so on are displayed.

The main unit 103 includes a scanner interface (a scanner I/F) 104, a printer interface (a printer I/F) 105, an image processing unit 106, a control unit 107, an operation control unit 109, and a power unit 120. The main unit 103 further includes hard disk (HDD) 117 installed inside the MFP 201 as a storage unit, and a hard disk controller 116. The main unit 103 further includes a network interface 110 as an interface unit with the outside. The main unit 103 further includes a camera control unit 122, a face unit collation unit 124, and a collation face data storage unit 125. The main unit 103 further includes a bus 112 that controls and connects these components.

The HDD 117 is a storage used to temporarily store scanned images and print images, or to temporarily store various data. Other storage device, such as solid-state drive (SSD), may be provided instead of the HDD, or these may be used together.

The image processing unit 106 performs image processing optimum for transferring images read by the scanner 101 to each unit. For example, the image processing unit 106 performs optimum compression processes when, for example, the scanned image is transferred to the HDD 117 or transferred to an external device via the IP network 113. The image processing unit 106 performs image processing to obtain printed output from the printer 102.

A print image source may include images read from the scanner 101, and images stored in the HDD 117. The print image source may also include print images transferred via the IP network 113 and the network I/F 110. The image processing unit 106 performs various image processes, such as extending and resolution conversion, so that the documents are printed from each image source in the optimum manner.

The control unit 107 controls the image processing unit 106, the scanner I/F 104, the printer I/F 105 and other components connected via the bus 112, and handles images. The operation control unit 109 controls the manipulation unit 111, and converts the operator's instruction data into the form controllable by the control unit 107.

The reference numeral 121 denotes an alternating current (AC) power supply that generally is plugged into a commercial power supply for the supply of power. The power unit 120 converts AC voltage supplied from the AC power supply 121 into direct current (DC) voltage, and is, although not illustrated, connected to the main unit 103 to supply power. Although not illustrated, a main power switch (SW) is included in the power unit 120.

An authentication server 126 that provides an authentication service for face recognition from face data, and a user profile storage server 128 that stores user profile information for each user are connected to the IP network 113. A cloud server, not illustrated, that stores user's own documents and so on is also connected to the IP network 113.

The camera unit 127 is a camera that captures a user using the MFP 201, and captures an image of a predetermined region near the MFP 201 (including a region assumed that the user is located at least during manipulation) to extract face data of the user. The camera unit 127 is connected to the camera control unit 122. The camera control unit 122 is connected to the control unit 107 via the bus 112.

The camera control unit 122 determines a person from image data (i.e., an image captured by the camera unit 127) received from the camera unit 127, extract face data from the determined person and transfers the face data to the face unit collation unit 124. If a plurality of persons are determined, the camera control unit 122 extracts face data from each of a plurality of persons, and transmits the face data to the face unit collation unit 124. Face data is feature information extracted from an authentication target's face and by which authentication target's face is characterized, to perform face recognition of the authentication target.

The face unit collation unit 124 sequentially collates the face data transferred from the camera control unit 122 with the face data stored in the collation face data storage unit 125. The face data is collated, for example, based on calculated similarity between transferred face data and face data stored in the collation face data storage unit 125 (e.g., transferred face data and stored face data are determined to be collated when similarity exceeds a threshold). After the collation, the face data that cannot be collated is authenticated in the authentication server 126 via the network I/F 110 and the IP network 113 under the control of the camera control unit 122 and the control unit 107. The face data that was able to be collated with the face data stored in the collation face data storage unit 125 is regarded as authenticated data in the camera control unit 122 and is not re-authenticated in authentication server 126. That is, the camera control unit 122 temporarily holds face data used for authentication in the collation face data storage unit 125 and, re-authentication may be performed by using the face data held in the collation face data storage unit 125 without involving the authentication server 126.

Authentication with the authentication server 126 is performed as follows. For example, similarity between received face data and face data held in the authentication database 129 is calculated; these face data are collated based on the calculated similarity (e.g., it is determined that collation is successfully completed if similarity exceeds a threshold); if collated, it is determined that authentication has successfully been performed, and if not, it is determined that authentication has not successfully been performed.

If authentication is successfully completed in the authentication server 126, the face unit collation unit 124 is notified by the authentication server 126 under the control of the camera control unit 122 and the control unit 107 via the network I/F 110 and the IP network 113, and stores the authenticated face data in the collation face data storage unit 125 for next collation or verification. The collation face data storage unit 125 has at least a storage area that can store feature information for the number of persons that the camera control unit 122 can recognize simultaneously. These cameras are controlled by the camera control unit 122 and the control unit 107. Details of camera control are described later.

The MFP 201 detects persons approaching itself with the camera unit 127, and performs face recognition in advance. Therefore, the MFP 201 acquires user profile information related to the authenticated user in advance from the user profile storage server 128 connected to the IP network 113. Examples of the user profile information include, but not limited to, information with which the manipulation unit 111 is customized to the user; although not illustrated, connection information, such as cloud server in which personal data is stored, connected to the IP network 113; and user information including personal address book, application peculiar to the user, and so on. By acquiring and preparing user profile information in advance, the user may manipulate the manipulation unit 111 without any waiting time. In accordance with the acquired user profile information, connection to the cloud server, and preparation of the personal address book and downloading of applications peculiar to the user, and so on may be performed at this timing. Note that the user profile information is not necessarily acquired from the external device, such as the user profile storage server 128: it may be acquired from a storage device in the MFP 201, such as the HDD 117.

The control unit 107 manages the entire control of the main unit 103. The control unit 107 includes a CPU 114 and a memory 108 that are main units thereof. The memory 108 includes ROM that stores a control program executed by the CPU 114, and work RAM used by the CPU 114 as temporary memory. The control unit 107 functions when the CPU 114 reads and executes the program stored in the memory 108. The camera control unit 122 and the face unit collation unit 124 are configured by, for example, a processor, and function by reading and executing a program stored in an unillustrated storage device, such as ROM.

Figure 2:
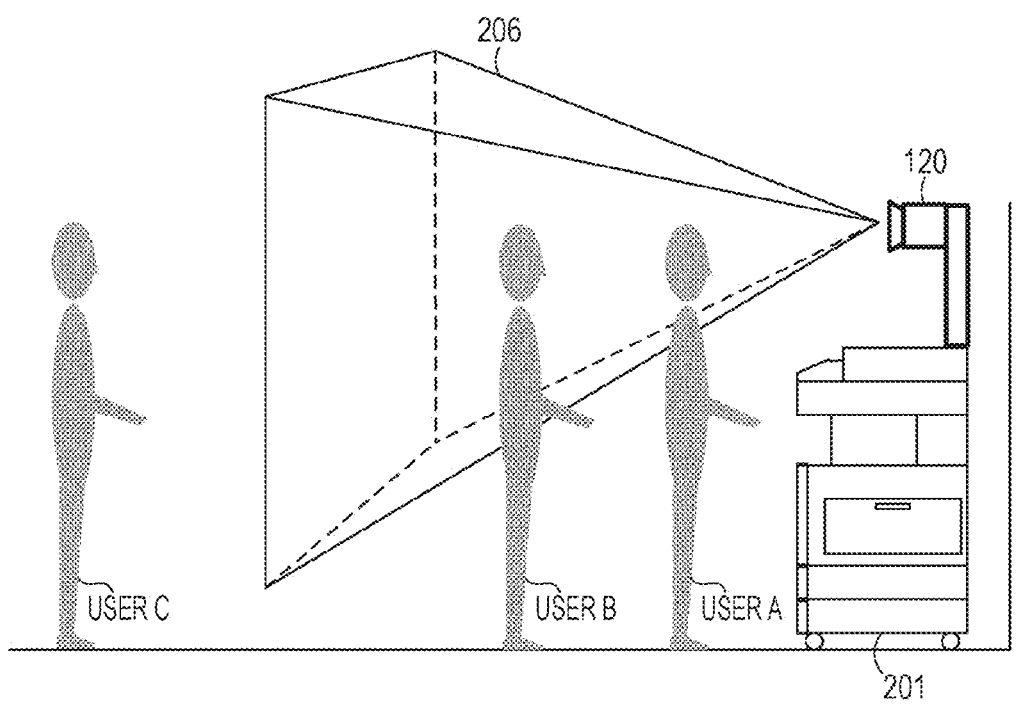
FIG. 2 illustrates a camera recognition area of an MFP.
Figure 3:
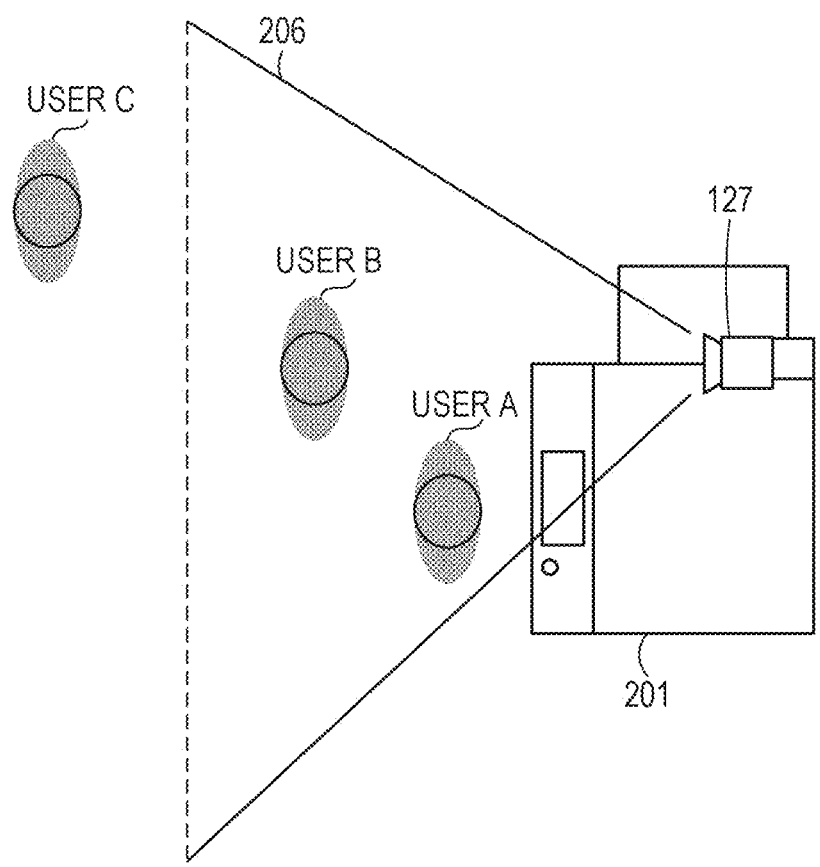
FIG. 3 illustrates a camera recognition area of an MFP.

FIGS. 2 and 3 illustrate a camera recognition area of the MFP 201.

FIG. 2 is a side view and FIG. 3 is a bird's-eye view.

In FIGS. 2 and 3, the reference numeral 206 denotes a camera recognition area of the camera unit 127. In an example illustrated in FIGS. 2 and 3, the users A and B are located in the camera recognition area 206. The user A stands in front of the manipulation unit 111 of the MFP 201 and is manipulating it, and the user B is waiting. The user C is approaching the camera recognition area 206.

Figure 4:
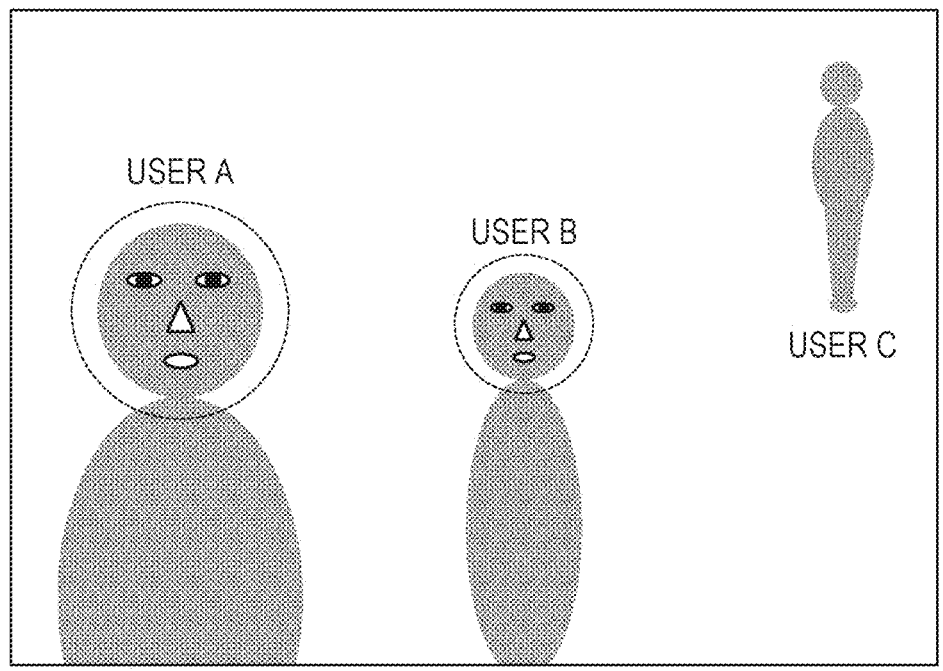
FIG. 4 schematically illustrates a camera image seen through a camera unit.

FIG. 4 schematically illustrates a camera image of the state of FIGS. 2 and 3 seen through the camera unit 127.

In the example of FIG. 4, as illustrated in FIGS. 2 and 3, the camera control unit 122 is detecting two persons (the users A and B) located in the camera recognition area 206. The users A and B are located in the camera recognition area 206, and are determined by the camera control unit 122 to be persons. Face data of the users A and B has been extracted in the camera control unit 122 and has been authenticated by the authentication server 126 using the face data. The extracted face data of the users A and B is stored in the collation face data storage unit 125.

On the other hand, the user C is located outside the camera recognition area 206, and is not determined by camera control unit 122 to be a person.

Figure 5:
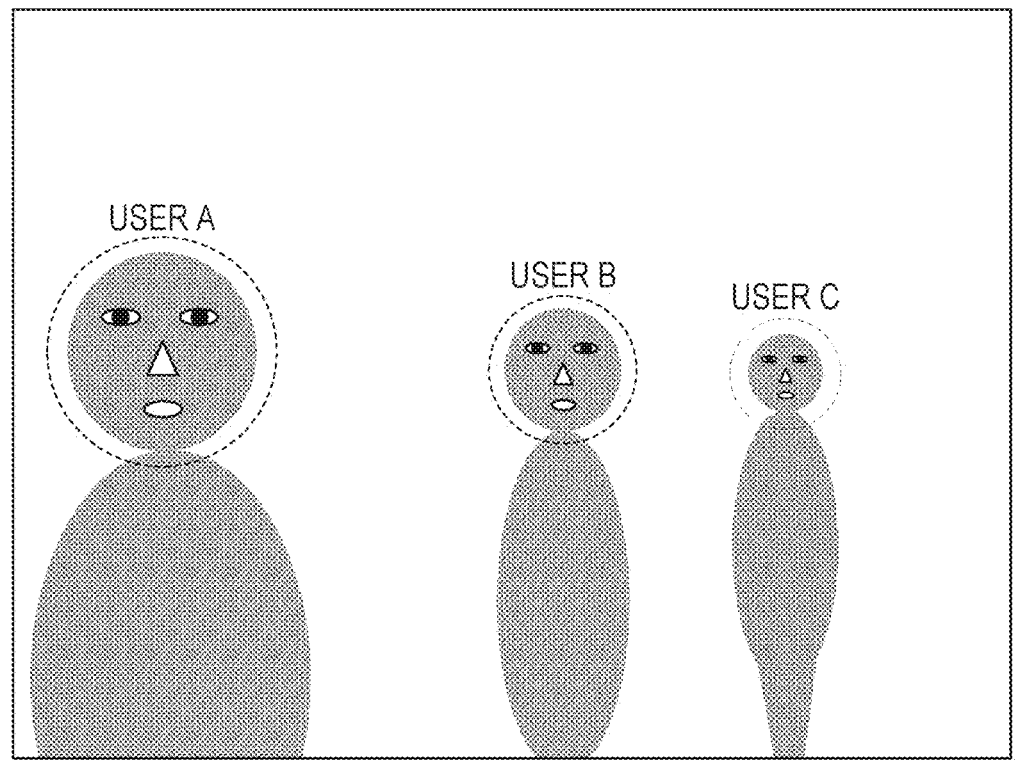
FIG. 5 schematically illustrates a camera image seen through a camera unit.

FIG. 5 schematically illustrates a camera image seen through the camera unit 127 in which the user C has further approached the MFP 201 from state of FIG. 4, and has entered the camera recognition area 206.

In the state illustrated in FIG. 5, the camera control unit 122 determines the user C as a person, and detects that the number of persons located in the camera recognition area 206 has changed from two to three. In this case, the camera control unit 122 extracts face data about all the persons in the camera recognition area 206 captured by the camera unit 127. Specifically, face data extracted from each of the users A, B, and C, is transferred to the face unit collation unit 124.

The face unit collation unit 124 collates the face data of each of users A, B, and C transferred from the camera control unit 122 with the face data stored in the collation face data storage unit 125. The face data of users A and B matches with the data stored in the collation face data storage unit 125. Regarding the user C, since there is no matching data stored in the collation face data storage unit 125, it is determined that new authentication is necessary. Face data of the user C is temporarily stored in the collation face data storage unit 125.

The face unit collation unit 124 sends update information to the control unit 107 from the camera control unit 122 via the bus 112 to notify that determination of new authentication is needed. Upon reception of the update notification, the control unit 107 receives the face data of the user C from the face unit collation unit 124, and sends the data to the authentication server 126 via the network I/F 110 and the IP network 113.

Upon reception of the face data, the authentication server 126 collates the face data with the face data stored in the authentication database 129. If, for example, the face data of the user C is determined to be data deserved for collation, the authentication server 126 transmits notification of an ID number of the user C to the control unit 107 as permission of authentication via the IP network 113 and the network I/F 110. Based on the notification of the ID number, the control unit 107 controls to permit use of the MFP 201 by the user C.

The control unit 107 notifies the camera control unit 122 of the acquired ID number, and, regarding the face data of the user C temporarily stored in the collation face data storage unit 125, issues a command to store the face data with the associated with the ID number. The face unit collation unit 124 stores the face data of the user C in the collation face data storage unit 125 with the associated with the acquired ID number under the control of the camera control unit 122.

The control unit 107 acquires user profile information of the user C from a user profile storage server (not illustrated) connected to the IP network 113 from the received ID number of the user C. The control unit 107 prepares for the user C to use the MFP 201 from the acquired user profile information.

As described above, the number of times of authentication processes to the authentication server 126 may be reduced by temporarily holding the face data of the authenticated person in the MFP 201. Further, the number of times of verification may be reduced by verifying whether the person has been authenticated using face data only when a change in persons recognizable (e.g., a change in the number of persons) occurs in the camera recognition area 206. Thus, preparation for the person captured with the camera to use the MFP is made.

For example, if the user C left the camera recognition area 206, the camera control unit 122 detects that the number of person has changed from three to two. The camera control unit 122 extracts face data regarding all the persons in the camera recognition area 206 captured by the camera unit 127. In this case, for example, face data of the users A and B still remaining in the area is extracted. The extracted face data is transferred to the face unit collation unit 124. The face unit collation unit 124 collates the face data extracted each of the users A and B with the face data stored in the collation face data storage unit 125. The face data of the users A and B matches the data stored in the collation face data storage unit 125.

Regarding the face data of the user C stored in the collation face data storage unit 125, since there is no data matching with the extracted face data, the face unit collation unit 124 determines that the user C has left the camera recognition area 206. If the face unit collation unit 124 determines that the user C has left the camera recognition area 206, the face unit collation unit 124 deletes the face data of the user C from the collation face data storage unit 125. The face unit collation unit 124 notifies the control unit 107 of update information of leaving of the user C and the ID of the user C via the camera control unit 122 and the bus 112. Upon reception of the update information, the control unit 107 deletes the user profile information of the user C from the MFP 201 based on the ID.

Thus, the minimum necessary face data is always stored in the collation face data storage unit 125. Security risk is minimized by holding necessary minimum biometrics information in the MFP 201. The user A using the MFP 201 can log out from the MFP 201 by intention by pressing a logout button (not illustrated) on the manipulation unit 111. The user presses the logout button to instruct to end of the use of the MFP 201. Upon logging out, the face data and the user profile information of the user who logged out are deleted from the collation face data storage unit 125 by the control of the control unit 107.

By the control of the camera control unit 122 and the like, the face data may be deleted from the collation face data storage unit 125 when a certain time period elapsed (timeout) after the face data is stored in the collation face data storage unit 125 (e.g., 20 minutes). Thus, since the user having elapsed a certain period of time after being authenticated by the authentication server 126 needs to be authenticated by the authentication server 126 again, security may be improved. In the timeout, this user's user profile information may also be deleted together, and it may constitute so that user profile information may not be deleted. The certain period of time is defined by, for example, an administrator from the manipulation unit 111 and the like, and is stored in, for example, unillustrated memory of the HDD 117 or the camera control unit 122.

Figure 6:
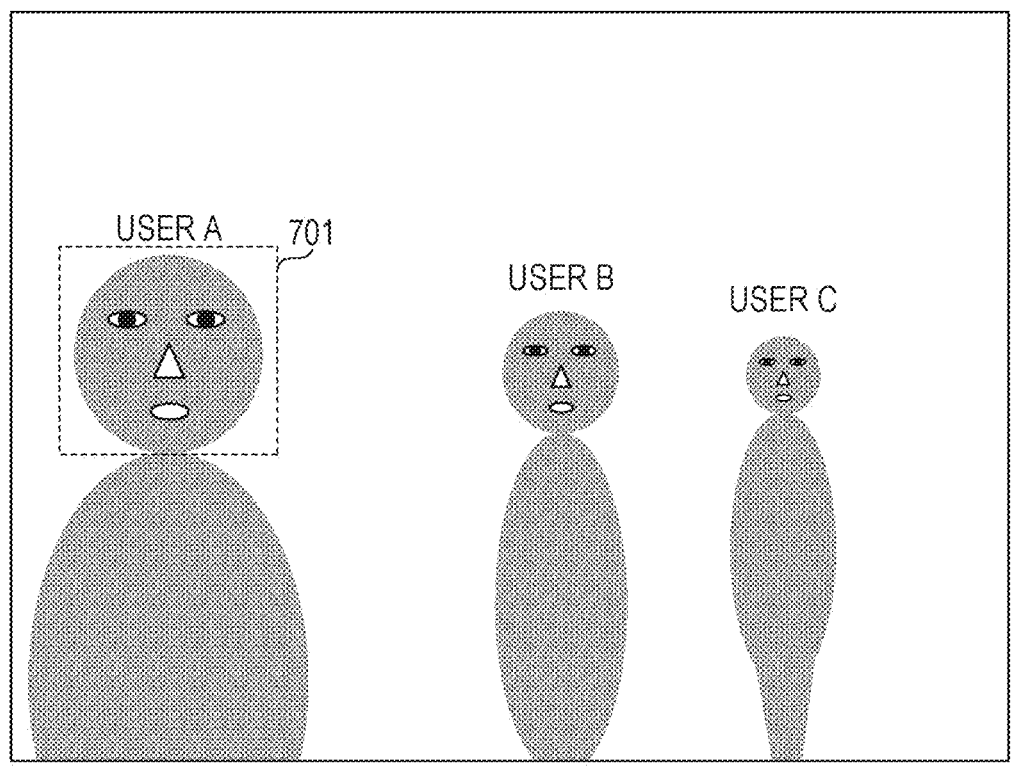
FIG. 6 illustrates a configuration for determining a priority user.
Figure 7:
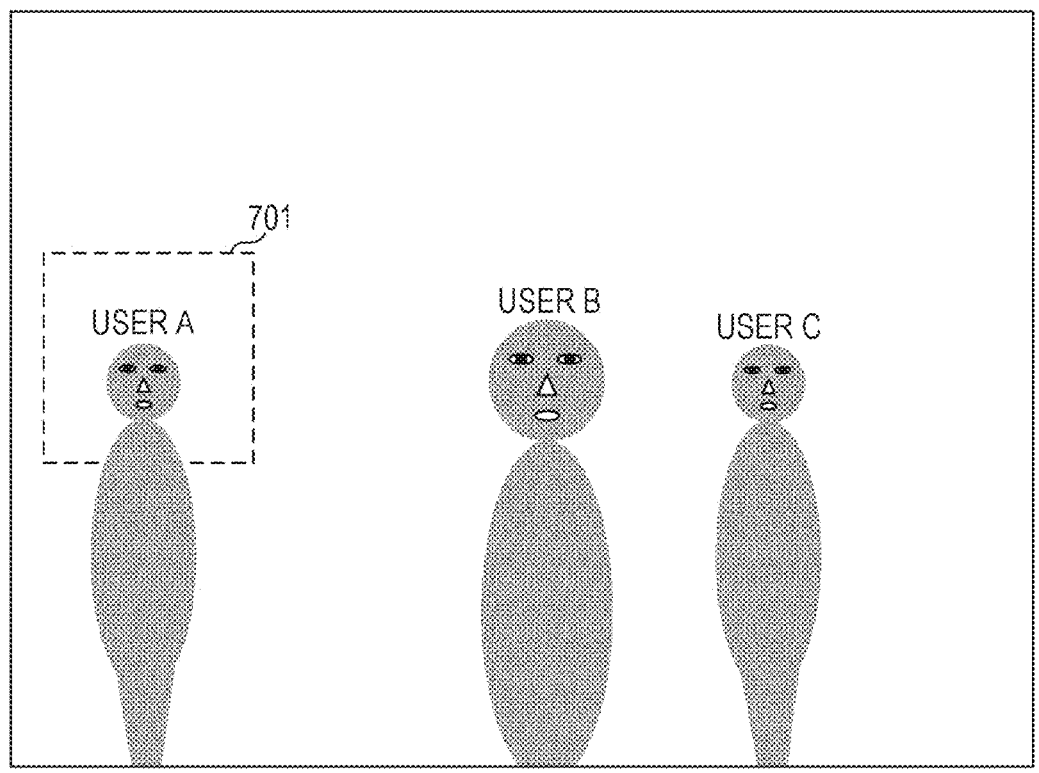
FIG. 7 illustrates a configuration for determining a priority user.

FIGS. 6 and 7 illustrate a configuration for determining a priority user who uses the manipulation unit 111. In the state illustrated in FIG. 6, authentication of the users A, B, and C by the camera unit 127 has been completed. Among the users, the user A stands in front of the manipulation unit 111, and manipulates the MFP 201.

The camera control unit 122 defines a region as denoted, for example by the reference numeral 701 as a detection area of the manipulator (a user detection area) for detecting the manipulator in the camera image. The camera control unit 122 detects a distance to the user based on the magnitude of the face (i.e., the size of the face image) in the user detection area 701 and, if it is determined that the user is in front of the manipulation unit 111, acquires the face data. The camera control unit 122 sends the face data to the face unit collation unit 124 for the collation with data in the collation face data storage unit 125. If collation is successfully completed, the person is notified to the control unit 107 as a priority user of the manipulation unit 111. Based on the user profile information of the priority user, the control unit 107 customizes the manipulation unit 111 for the priority user, and makes display on the manipulation unit 111.

As illustrated in FIG. 7, for example, even if the user A enters the user detection area 701, and if it is determined that the user A is distant from the manipulation unit 111 based on the magnitude of the face, the user A is excluded from the manipulator by the camera control unit 122.

Although a configuration in which the distance between a person and the MFP 201 is measured based on the magnitude (size) of the face image in the user detection area 701 in the present embodiment, the method for measuring the distance between a person and the MFP 201 is not limited to the same. The distance between a person and the MFP 201 may be measured based on the magnitude of a portrait image (it may be a face, the entire body, or other part, such as a hand) in a specific region of the camera image.

Hereinafter, a process in a case in which the persons located in the camera recognition area 206 have changed is described with reference to FIGS. 8A-8B and 9.

Figure 8A:
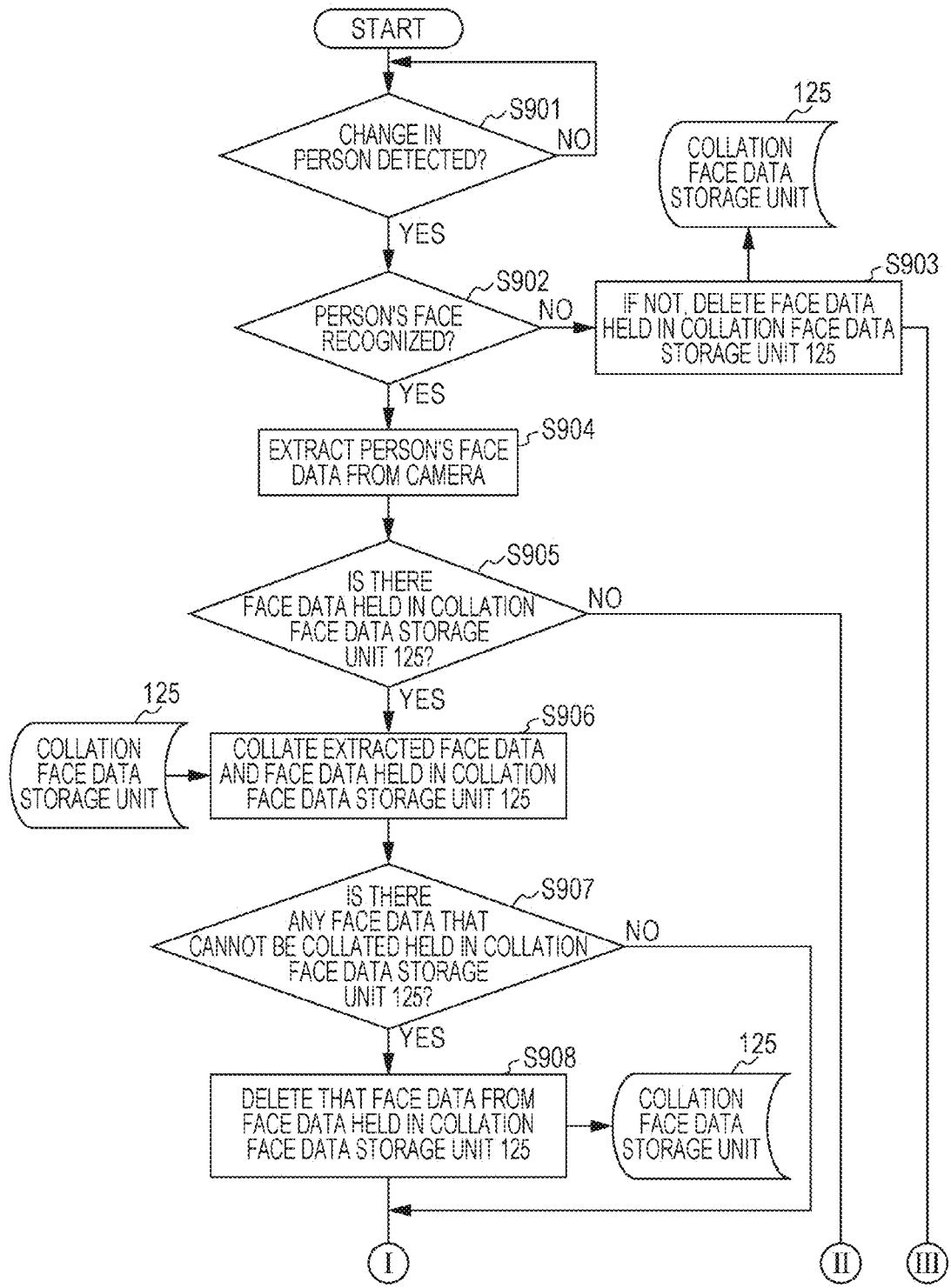
FIGS. 8A-8B are a flowchart illustrating a process of a camera control unit.
Figure 8B:
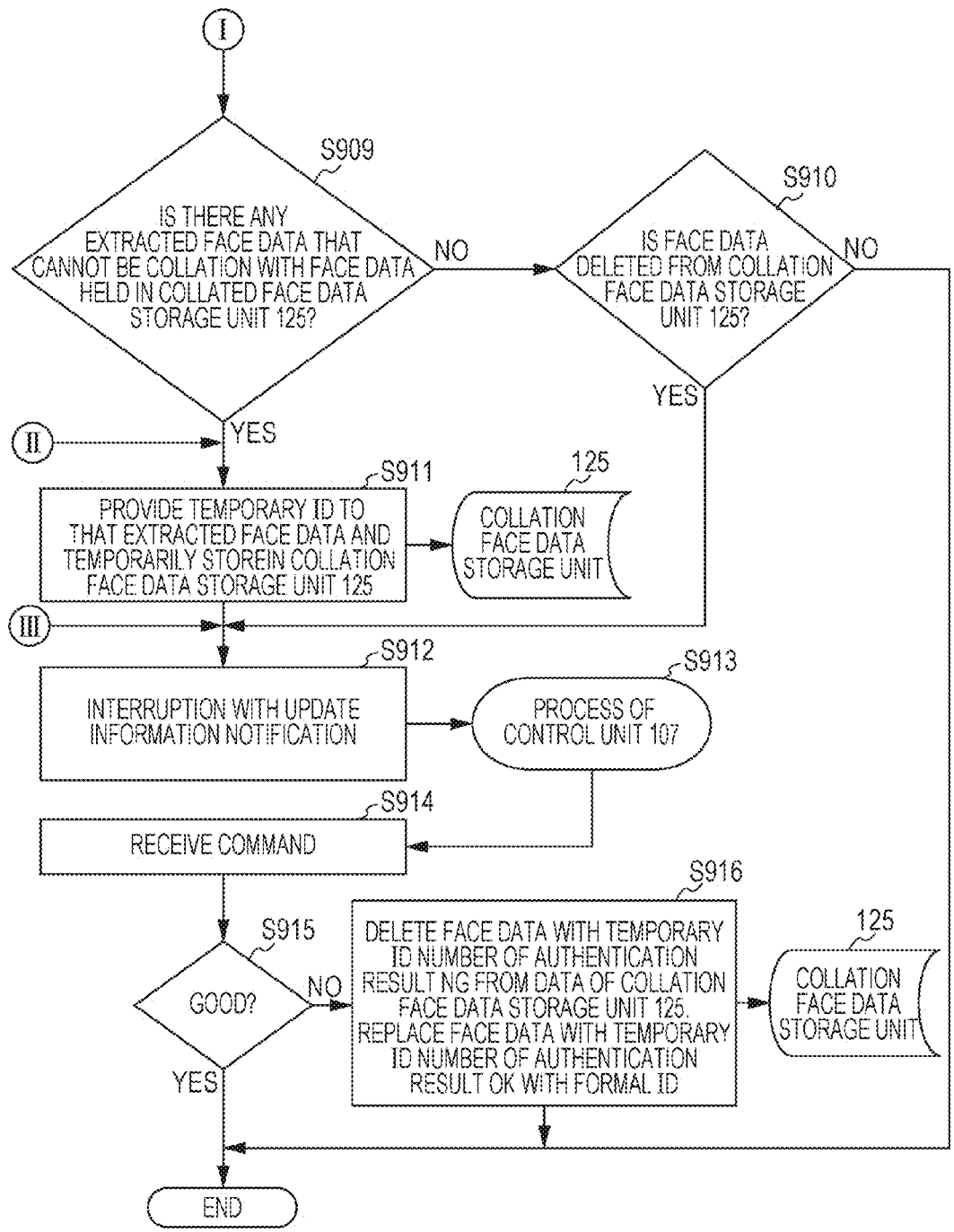

FIGS. 8A-8B are a flowchart illustrating a process of the camera control unit 122. The process of this flowchart is performed by, for example, the camera control unit 122 as a processor reading and executing the program stored in the storage device, such as unillustrated ROM. The reference numerals starting with "S" denote steps.

FIG. 9 is a flowchart illustrating the process of the control unit 107. The process of this flowchart is performed in the control unit 107 by the CPU 114 reading and executing the program stored in the memory 108. The reference numerals starting with "S" denote steps.

The process of FIGS. 8A-8B and the process of FIG. 9 are performed in cooperation with each other and solve the problem.

First, the process of the camera control unit 122 illustrated in FIGS. 8A-8B are described.

After the process of FIGS. 8A-8B are started, in S901, the camera control unit 122 monitors whether a change in persons located in the camera recognition area 206 has been detected from the image captured by the camera unit 127. Specifically, it is determined whether a change in the number of persons located in the camera recognition area 206 (a change in the number of persons located in the camera recognition area) has been detected. The method for detecting the change in persons is not limited to the same: for example, an inter-frame difference of the camera image captured by the camera control unit 122 may be calculated and it may be determined that a change in persons is detected when the difference exceeds a threshold.

If it is determined that no change in persons has been detected (S901: No), the camera control unit 122 continues monitoring of S901.

If it is determined that a change in persons has been detected (S901: Yes), the camera control unit 122 proceeds the process to S902.

In S902, the camera control unit 122 determines whether the persons' face has been recognized.

If it is determined that the persons' face cannot be recognized (S902: No), the camera control unit 122 determines that the persons have left from the area near the MFP 201 and nobody remains, and proceeds the process to S903.

In S903, the camera control unit 122 deletes held face data held in the collation face data storage unit 125 and proceeds the process to S912.

If it is determined that the persons' face has been recognized (S902: Yes), the camera control unit 122 proceeds the process to S904.

In S904, the camera control unit 122 extracts face data from the image captured, and transfers the extracted face data to the face unit collation unit 124. If faces of a plurality of persons have been recognized, the camera control unit 122 extracts and transfers face data of the plurality of (i.e., all of the) persons.

Next, in S905, the face unit collation unit 124 determines whether the face data is held in the collation face data storage unit 125.

If it is determined that face data is not held in the collation face data storage unit 125 (S905: No), the face unit collation unit 124 determines that all of the extracted face data is the face data of the users requiring new authentication, and notifies the camera control unit 122 of the fact. Upon reception of this notification, the camera control unit 122 proceeds the process to S911, where it performs the new authentication process.

If it is determined that the face data is held in the collation face data storage unit 125 (S905: Yes), the face unit collation unit 124 proceeds the process to S906.

In S906, the face unit collation unit 124 collates the face data extracted by the camera control unit 122 with the face data held in the collation face data storage unit 125.

Next, in S907, the face unit collation unit 124 determines a collation result of S906. Specifically, the face unit collation unit 124 determines whether there is face data that cannot be collated with the extracted face data among the face data held in the collation face data storage unit 125.

If it is determined that there is face data that cannot be collated with the extracted face data among the face data held in the collation face data storage unit 125 (S907: Yes), the face unit collation unit 124 proceeds the process to S908.

In S908, the face unit collation unit 124 determines that the face data that cannot be collated with the extracted face data among the face data held in the collation face data storage unit 125 is the face data of the user who has left the area near the MFP 201, deletes that face data from the collation face data storage unit 125, and then proceeds the process to S909.

If it is determined that all of the face data held in the collation face data storage unit 125 has been collated with the extracted face data (S907: No), the face unit collation unit 124 proceeds the process to S909.

In S909, the face unit collation unit 124 determines a collation result. Specifically, the face unit collation unit 124 determines whether there is face data that cannot be collated with the face data held in the collation face data storage unit 125 among the extracted face data.

If it is determined that all of the extracted face data has been collated with the face data held in the collation face data storage unit 125 (S909: No), the face unit collation unit 124 notifies the camera control unit 122 of the fact. Upon reception of this notification, the camera control unit 122 proceeds the process to S910.

In S910, the camera control unit 122 determines whether the face data held in the collation face data storage unit 125 has been deleted. Specifically, the face unit collation unit 124 determines whether the face data has been deleted in S908.

If it is determined that the face data has not been deleted from the collation face data storage unit 125 (S910: No), the camera control unit 122 completes the process of this flowchart regarding that no change has occurred in the extracted face data.

If it is determined that face data has been deleted from the collation face data storage unit 125 (S910: Yes), the camera control unit 122 proceeds the process to S912, where the control unit 107 is notified of the ID number of that face data.

If it is determined that, in S909, there is face data that cannot be collated with the face data held in the collation face data storage unit 125 among extracted face data (S909: Yes), the face unit collation unit 124 notifies the camera control unit 122 of information about the face data that cannot be collated. Upon reception of the notification, the camera control unit 122 proceeds the process to S911 with the face data that cannot be collated as face data to be newly authenticated. That is, by the face unit collation unit 124 performing the processes of S906, S909, and S910, the camera control unit 122 can check whether each person has been authenticated based on the face data of each person extracted in S904.

In S911, the camera control unit 122 provides a temporary ID to each of the face data that needs to be newly authenticated, temporarily stores the face data in the collation face data storage unit 125, and proceeds the process to S912.

In S912, the camera control unit 122 causes an interruption via the bus 112 to notify the control unit 107 of update information regarding the content of the face data held in the collation face data storage unit 125. Specifically, the update information is ID information of the face data deleted from the collation face data storage unit 125, and face data that needs to be newly authenticated and a temporary ID.

In S913, the control unit 107 processes depending on the interruption. Details of the process performed by the control unit 107 is described later with reference to FIG. 9. After the process of the control unit 107 of S913 is completed, the camera control unit 122 receives a command from the control unit 107 via the bus 112 in S914. Specifically, the commands to receive are "status GOOD process end," "authentication status" and so on, which are described later with reference to FIG. 9.

Next, in S915, the camera control unit 122 determines whether the received command is "status GOOD process end."

If it is determined that the received command is "status GOOD process end" (S915: Yes), the camera control unit 122 completes the process of this flowchart.

If it is determined that the received command is "authentication status" (S915: No), the camera control unit 122 proceeds the process to S916 and performs the process based on the subsequently sent authentication information. Specifically, "authentication status" is information about the authentication result (OK or NG) associated with the temporary ID. If the authentication result is OK, a formal ID number is also added to the "authentication status."

In S916, regarding the face data of the temporary ID number of which authentication result is NG, the camera control unit 122 deletes data from the collation face data storage unit 125. Regarding the face data of the temporary ID number of which authentication result is OK, the camera control unit 122 replaces the temporary ID number with the formal ID, stores in the collation face data storage unit 125, and completes the process of this flowchart.

Next, a process of the control unit 107 illustrated in FIG. 9 is described.

After the process of FIG. 9 is started, the control unit 107 monitors an interruption from the camera control unit 122 in S1001.

While the control unit 107 does not detects an interruption (the period of No in S1001), the control unit 107 continues monitoring of S1001.

If it is determined that an interruption is detected (S1001: Yes), the control unit 107 proceeds the process to S1002.

In S1002, the control unit 107 reads update information from the camera control unit 122 via the bus 112 and temporarily stores it in memory 108. Specifically, the update information is the ID information of deleted face data, and face data that needs to be newly authenticated and a temporary ID.

Next, in S1003, the control unit 107 determines whether the face data stored in the collation face data storage unit 125 has been deleted based on the update information acquired in S1002.

If it is determined that the face data stored in the collation face data storage unit 125 has been deleted (S1003: Yes), the control unit 107 proceeds the process to S1004. In S1004, based on the deleted ID information specified from the update information, the control unit 107 deletes user profile information associated with the ID and stored in the memory 108, changes the state of user into a logout state, and proceeds the process to S1005.

If it is determined that the face data stored in the collation face data storage unit 125 has not been deleted (S1003: No), the control unit 107 proceeds the process to S1005.

In S1005, the control unit 107 determines whether there is any face data that needs to be newly authenticated.

If it is determined that there is no face data that needs to be newly authenticated (S1005: No), the control unit 107 proceeds the process to S1010.

In S1010, the control unit 107 sends the "status GOOD process end" command to the camera control unit 122, and completes the process of this flowchart.

In S1005, if it is determined that there is face data that needs to be newly authenticated (S1005: Yes), the control unit 107 proceeds the process to S1006.

In S1006, to perform authentication, the control unit 107 sequentially sends new face data to the authentication server 126 while associating with the temporary ID number, via the network I/F 110 and the IP network 113. If authentication is successfully completed, the authentication server 126 issues a formal ID and, if not the authentication server 126 responds with an authentication NG.

Next, in S1007, the control unit 107 acquires the authentication result from the authentication server 126 and, regarding the temporary ID number for which authentication has been successfully completed, associates a formal ID issued by the authentication server 126 with the temporary ID number, and temporarily stores in the memory 108. If authentication has not been successfully completed, information indicating authentication NG associating with the temporary ID number is temporarily stored in the memory 108.

Next, in S1008, based on the formal ID that has been successfully authenticated, the control unit 107 acquires user profile information associated with the formal ID from a user profile storage server (not illustrated) connected to the IP network 113, and store the user profile information in the memory 108 associated with the ID. Thus, if a user is authenticated as a result of face recognition, the MFP may be prepared in advance for the use of the user by acquiring user profile information in advance. In the MFP 201 of the present embodiment, if a plurality of users are authenticated, the plurality of authenticated users may be put into the login state, in which the use of the apparatus is permitted.

Next, in S1009, the control unit 107 sends a command "authentication status" to the camera control unit 122 via the bus 112 based on the result of the process, and completes the process of this flowchart. The authentication information sent subsequent to the "authentication status" is the authentication information associated with the temporary ID number stored in the memory 108. Specifically, the information is OK or NG regarding the authentication result associated with the temporary ID. If the authentication result is OK, the formal ID number is also added. After sending the authentication information, the control unit 107 deletes information other than the user profile information associated with the formal ID from the memory 108.

Hereinafter, a process to determine the priority user is described with reference to FIG. 10.

Figure 10:
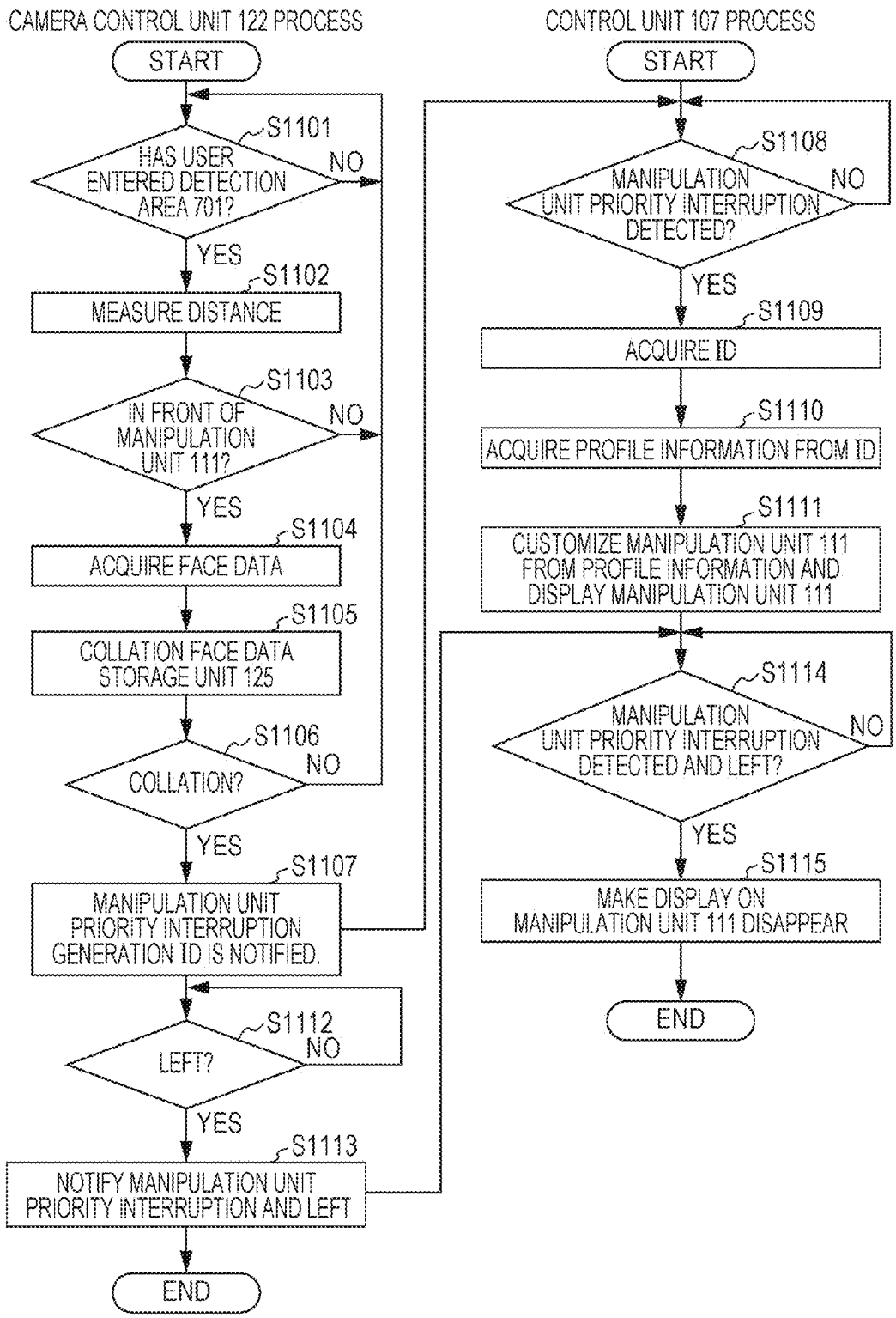
FIG. 10 is a flowchart illustrating a process for determining a priority user.

FIG. 10 is a flowchart illustrating the process to determine the priority user who uses the manipulation unit 111. The camera control unit 122 and the control unit 107 cooperate with each other to execute the process of this flowchart. The process of the camera control unit 122 is implemented by, for example, the camera control unit 122 as a processor reading and executing a program stored in an unillustrated storage device, such as ROM. The process of the control unit 107 is implemented by the CPU 114 reading and executing the program stored in the memory 108. The reference numerals starting with "S" denote steps.

In S1101, the camera control unit 122 monitors whether a user has entered the user detection area 701 illustrated in FIG. 6.

If it is determined that no user has entered the user detection area 701 (S1101: No), the camera control unit 122 continues monitoring of S1101.

If it is determined that a user has entered the user detection area 701 (S1101: Yes), the camera control unit 122 proceeds the process to S1102.

In S1102, the camera control unit 122 measures the magnitude of the face detected in the user detection area 701, and calculates the distance with the user from the measurement result.

Next, in S1103, the camera control unit 122 determines whether the user is located in front of the manipulation unit 111 based on the measurement result of S1102.

If it is determined that the user is not located in front of the manipulation unit 111 (S1103: No), the camera control unit 122 returns the process to S1101.

If it is determined that the user is located in front of the manipulation unit 111 (S1103: Yes), the camera control unit 122 proceeds the process to S1104.

In S1104, the camera control unit 122 acquires face data of the user who has entered the user detection area 701.

Next, in S1105, the camera control unit 122 transfers the face data acquired in S1104 to the face unit collation unit 124. The face unit collation unit 124 collates the transferred face data with the data in the collation face data storage unit 125, and returns the collation result to the camera control unit 122.

Next, in S1106, the camera control unit 122 determines the collation result. If it is determined that collation has not been successfully completed (S1106: No), the camera control unit 122 returns the process to S1101.

If it is determined that collation has been successfully completed (S1106: Yes), the camera control unit 122 determines the user detected in S1101 as the priority user, and proceeds the process to S1107.

In S1107, the camera control unit 122 causes a manipulation unit priority interruption to the control unit 107 via the bus 112 to notify the collated user's ID.

In S1108, the control unit 107 monitors whether the manipulation unit priority interruption has occurred.

If no manipulation unit priority interruption has occurred (S1108: No), the control unit 107 continues monitoring of S1108.

If the manipulation unit priority interruption has occurred (S1108: Yes), the control unit 107 proceeds the process to S1109.

In S1109, the control unit 107 performs the process of the manipulation unit priority interruption, and acquires the ID of that user from the camera control unit 122 via the bus 112.

Next, in S1110, the control unit 107 acquires the user profile information stored in the memory 108 from the acquired ID of that user.

Next, in S1111, based on a manipulation unit layout included in the user profile information, the control unit 107 customizes the display of the manipulation unit 111 for that user, and displays. Further, the control unit 107 connects to a cloud server corresponding to the cloud server path included in the user profile information, and sets up an address book, and so on. That is, the control unit 107 sets up the MFP 201 in accordance with the user profile information.

In S1112, the camera control unit 122 monitors whether that user has left the user detection area 701.

If it is determined that the user has not left the user detection area 701 (S1102: No), the camera control unit 122 continues monitoring of S1112.

If it is determined that the user has left the user detection area 701 (S1112: No), the camera control unit 122 proceeds the process to S1113.

In S1113, the camera control unit 122 causes the manipulation unit priority interruption in the control unit 107 via the bus 112, notifies the control unit 107 of the leaving of the user, and completes the process of the camera control unit 122 in this flowchart.

In S1114, the control unit 107 detects the manipulation unit priority interruption, acquires information as to whether the user has left in the interruption process, and determines about the leaving.

If it is determined that the user has not left (S1114: No), the control unit 107 continues monitoring of S1114.

If it is determined that the user has left (S1114: Yes), the control unit 107 proceeds the process to S1115.

In S1115, the control unit 107 turns off the display on the manipulation unit 111 (that is, releases the setting based on the user profile information), and completes the process of the control unit 107 in this flowchart.

Thus, as illustrated in FIGS. 9 and 10, the MFP 201 permits login of a plurality of users located near the MFP 201 (e.g., the camera recognition area 206) by face recognition. In the MFP 201, if, for example, the user located near the MFP 201 (the camera recognition area 206) is changed (e.g., the number of the users is increased), face recognition of each user located near the MFP 201 (the camera recognition area 206) is performed (including verification of authenticated user). Thus, unnecessary operation may be avoided by defining timing at which face recognition is performed. In face recognition with the camera in the MFP 201, simultaneous login of a plurality of persons captured by the camera is possible, and in that case, setting information of each user is acquired and held in advance. Thus, when the user wants to manipulate the MFP 201, the service may be provided with the customized setting without keeping the user waiting.

FIG. 11 illustrates the user profile information stored in the user profile storage server 128.

As illustrated in FIG. 11, in the user profile information, user's own customization information is associated with each user ID. The user's own customization information includes, for example, manipulation unit layout information for customizing the manipulation unit 111, cloud server path information used by the user for storing personal data, and address book information of the user.

For example, regarding the user of user ID "A," the manipulation unit layout information is "layout A," the cloud server path information is "\ROOT\CLOUD\NAME_A," and the address book is "address_A."

When each user is authenticated regarding the MFP 201, the user profile information is read from the user profile storage server 128 for each ID, and is stored in the memory 108 in the MFP 201. The MFP 201 customizes the MFP 201 based on the user profile information of the priority user located in front of the manipulation unit 111. The priority user may build its own manipulating environment to the MFP 201. Thus, the user profile information is user information functioning as setting information for customizing the MFP 201 for each user.

FIG. 12 illustrates an ordinary manipulation unit layout.

Since the user C registers "ordinary screen layout" as the manipulation unit layout as illustrated in FIG. 11, if the user C becomes the priority user, the manipulation unit display as illustrated in FIG. 12 is displayed on the initial user I/F screen.

FIG. 13 illustrates a manipulation unit layout corresponding to the layout A.

Since the user A registers "layout A" as the manipulation unit layout as illustrated in FIG. 11, if the user A becomes the priority user, the manipulation unit display as illustrated in FIG. 13 is displayed on the initial user I/F screen based on the user profile information of the user A.

For example, in the layout A, a scan SEND button 1301 and a user BOX button 1302 are added to the ordinary layout illustrated in FIG. 12.

Since the user A often uses a scan SEND function of the MFP, the scan SEND button 1301 is disposed on the initial user I/F screen for the convenience of the user A. The user BOX button 1302 associated with the cloud server path information is also disposed. The user A registers such a manipulation unit layout in the user profile information.

As described above, the MFP 201 of the present embodiment permits use thereof based on personal authentication using face data and, when face data is extracted from an image captured by a camera, requests personal authentication by transmitting, to the authentication server, only the face data that cannot be verified as authenticated face data in the MFP without uniformly making an authentication request to the authentication server. The face data used for the authentication is temporarily held in the collation face data storage unit 125. When authentication of the user detected in the camera recognition area 206 is to be verified again, the face data held in the collation face data storage unit 125 is used. Therefore, authentication may be verified again not through the authorization system of the authentication server 126, whereby the number of times of authentication in the authentication server may be reduced, efficiency of face recognition may be increased, and re-verification of authentication may be performed quickly. Reduction in the number of times of authentication in the authentication server may decrease the increase in network traffic caused by the authentication request to the authentication server.

Further, a plurality of users located in the camera recognition area 206 may be put into the login state and, among the plurality of login users, a priority user may be determined based on the magnitude of the face entered the user detection area 701 of the camera image. Then the MFP 201 may be customized based on the profile information of the priority user. Therefore, the user located in front of the manipulation unit 111 may use the MFP 201 according to the user's specifications.

Further, when authentication of the user is successfully completed, the user profile information of the authenticated user (the login user) is acquired from the user profile storage server 128 and held and prepared in the MFP 201. Therefore, when the user is to manipulate the manipulation unit 111, the manipulation unit 111 is prepared according to the user's specifications without keep the user waiting.

Since the face data of the authenticated user is temporarily stored in the collation face data storage unit 125 only for a period in which the user is located in camera recognition area 206, security risk, such as a leakage of confidential personal information including face data for identifying users, may be reduced.

Aspects of the present invention are not limited to the image processing apparatus, such as the MFP, and are applicable to any information processing apparatus that permits the use thereof by performing face recognition with a camera. As described above, in an information processing apparatus that authenticates a user by transmitting feature information of the user extracted using a camera and the like, to an authentication server, an authenticated user may be verified quickly, and practicability may be improved.

Other Embodiments

Additional embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2014-194653, filed Sep. 25, 2014 which is hereby incorporated by reference herein in its entirety.

What is claimed is:

1. An information processing apparatus that permits a user to use thereof through authentication, comprising:
   an image capturing unit;
   an extracting unit configured to extract feature information of each person recognized based on images captured by the image capturing unit;
   a temporary storing unit configured to temporarily store feature information of one or more persons authenticated by an external apparatus, the external apparatus storing feature information of one or more persons to be authenticated;
   a verification unit configured to verify whether each person has been authenticated based on feature information stored in the temporary storing unit and feature information of each person extracted by the extracting unit; and
   an authentication unit configured to transmit feature information of a person who cannot be verified as authenticated to the external apparatus and request authentication of the person;
   wherein feature information of an authenticated person authenticated by an external apparatus is deleted from the temporary storing unit after the authenticated person left from an area, the extracting unit being able to extract feature information of each person in the area.

2. The information processing apparatus according to claim 1, further comprising a first detection unit configured to detect a change in person recognized from the captured image,
   wherein if a change in person is detected by the first detection unit, the extracting unit extracts each feature information of each person recognized from the captured image.

3. The information processing apparatus according to claim 2, wherein the change in person recognized from the captured image is a change in the number of persons recognized from the captured image.

4. The information processing apparatus according to claim 1, further comprising a first deletion unit configured to delete, from the temporary storing unit, feature information that cannot be collated with feature information of each person extracted by the extracting unit from among feature information stored in the temporary storing unit.

5. The information processing apparatus according to claim 4, wherein the first deletion unit deletes, from the temporary storing unit, feature information that has been stored in the temporary storing unit for a time exceeding a certain period of time.

6. The information processing apparatus according to claim 4, further comprising:
   an acquisition unit configured to acquire user information of each person authenticated by the authentication unit;
   a holding unit configured to hold the user information of each person acquired by the acquisition unit; and
   a second deletion unit configured to delete, from the holding unit, user information of a person corresponding to feature information to be deleted if feature information stored in the temporary storing unit is deleted by the first deletion unit.

7. The information processing apparatus according to claim 6, wherein the user information includes at least one of information for customizing a manipulation unit, connection information to a location where personal data is stored, or a personal address book.

8. The information processing apparatus according to claim 6, wherein the acquisition unit acquires the user information from the temporary storing unit or from a source external to the information processing apparatus.

9. The information processing apparatus according to claim 6, further comprising:
   a second detection unit configured to detect a portrait image in a specific region of the captured image of the image capturing unit;
   a determination unit configured to determine a person corresponding to the portrait image as a priority user based on the detected portrait image if a portrait image is detected in the specific region by the second detection unit; and
   a setting unit configured to acquire user information of the priority user from the holding unit and set the information processing apparatus based on the user information.

10. The information processing apparatus according to claim 9, wherein the determination unit measures a distance between a person corresponding to the portrait image and the information processing apparatus based on a size of the portrait image in the specific region and
    if the measured distance is shorter than a predetermined distance, determines the person as a priority user.

11. The information processing apparatus according to claim 9, wherein the portrait image is an image of a face.

12. The information processing apparatus according to claim 9, wherein the setting unit releases the setting based on the user information of the priority user when the portrait image is no longer detected from the specific region by the second detection unit.

13. The information processing apparatus according to claim 9, wherein the first deletion unit deletes the feature information of the priority user from the temporary storing unit when an instruction indicating that use of the information processing apparatus is completed is input.

14. The information processing apparatus according to claim 1, wherein the feature information of a person is information indicating a feature of a person's face.

15. The information processing apparatus according to claim 1, wherein the information processing apparatus is an image processing apparatus.

16. A method for controlling an information processing apparatus that permits a user to use thereof through authentication, the method comprising:
    capturing an image;
    extracting feature information of each person recognized based on the captured image;
    temporarily storing feature information of one or more persons authenticated by an external apparatus in a temporary storing unit, the external apparatus storing feature information of one or more persons to be authenticated;
    verifying whether each person has been authenticated based on feature information stored in the temporary storing unit and extracted feature information of each person; and
    transmitting feature information of a person who cannot be verified as authenticated to the external apparatus; and
    requesting authentication of the person;

wherein feature information of an authenticated person authenticated by an external apparatus is deleted from the temporary storing unit after the authenticated person left from an area, the information processing apparatus being able to extract feature information of each person in the area.

17. A non-transitory computer-readable storage medium storing computer executable instructions that cause a computer to execute a method for controlling an information processing apparatus that permits a user to use thereof through authentication, the method comprising:

capturing an image;

extracting feature information of each person recognized based on the captured image;

temporarily storing feature information of one or more persons authenticated by an external apparatus in a temporary storing unit, the external apparatus storing feature information of one or more persons to be authenticated;

verifying whether each person has been authenticated based on feature information stored in the temporary storing unit and extracted feature information of each person; and transmitting feature information of a person who cannot be verified as authenticated to the external apparatus; and requesting authentication of the person;

wherein feature information of an authenticated person authenticated by an external apparatus is deleted from the temporary storing unit after the authenticated person left from an area, the information processing apparatus being able to extract feature information of each person in the area.

* * * * *